April 7, 1936.  C. R. ANDERSON  2,036,183
ELECTRIC OVEN
Filed May 19, 1932
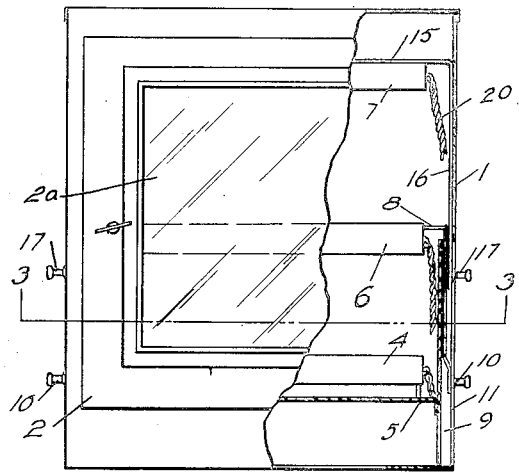
FIG. 1.
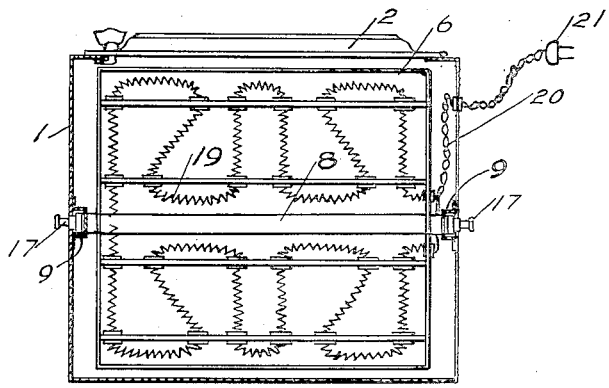
FIG. 3.
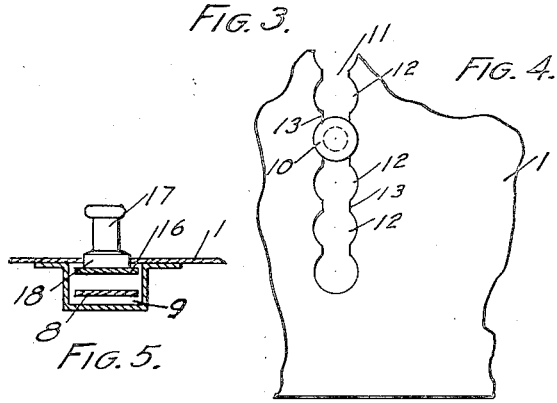
FIG. 4.
FIG. 5.
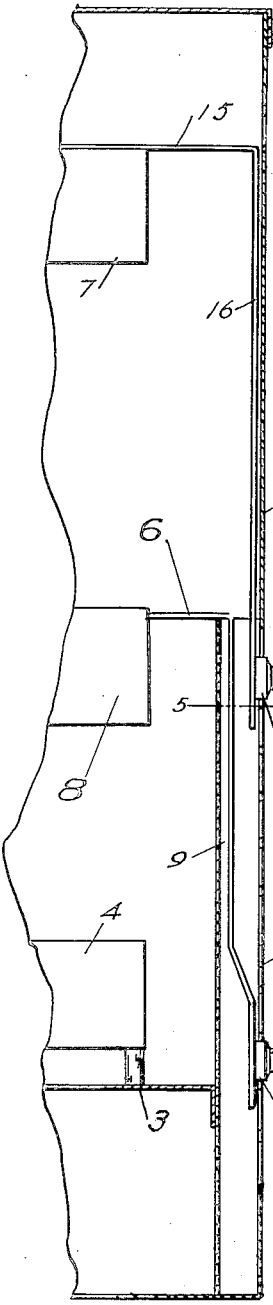
FIG. 2.
INVENTOR.
Carl R. Anderson
BY
ATTORNEYS.

Patented Apr. 7, 1936

2,036,183

UNITED STATES PATENT OFFICE 2,036,183

ELECTRIC OVEN

Carl R. Anderson, Erie, Pa., assignor to The Griswold Manufacturing Company, Erie, Pa., a corporation of Pennsylvania Application May 19, 1932, Serial No. 612,189

6 Claims. (Cl. 219—35)

With electric ovens of certain types, it is desirable to form the electrically heated plates which may be readily adjusted to vary the intensity of the heat. With plates so arranged and adjustable into close proximity with the article being cooked, it is possible to localize the heat and effect the cooking quickly and economically. In carrying out this manner of cooking, it is preferable to utilize the radiant heat of an exposed heating element from some of the plates. In the present invention, the adjustment of the heating plates may be very conveniently accomplished while the plate is in position in the oven and in consequence the variation in the intensity of the heat may be accomplished without chilling the material being cooked in the changing of the parts. In the present invention also some part of the wall, preferably the wall in the door is made transparent so that the condition of the article being baked may be observed and the temperature controlled with relation to the observed condition. Features and details of the invention will appear from the specification and claims.

A preferred embodiment of the invention is illustrated in the accompanying drawing as follows:—

Fig. 1 shows a front elevation of the oven, a part being broken away showing the interior in section.

Fig. 2 an enlarged sectional view of one side of the oven.

Fig. 3 a section on the line 3—3 in Fig. 1.

Fig. 4 a side elevation of the oven wall showing the adjusting mechanism.

Fig. 5 a section on the line 5—5 in Fig. 2.

I marks the oven wall in which is arranged a door 2 having a glass front 2a. An electrically heated plate 4 is mounted on a bottom plate 5 of the oven. This heating plate ordinarily remains stationary in this position and the heat from the heating element is conducted through the plate and cooking utensil to the material being baked. An adjustable plate 6 is arranged above the plate 4 and above this a second adjustable plate 7 is arranged. The plate 6 has a bar 8 secured to its edge which extends laterally to the side and then downwardly into a guide loop 9. An adjusting pin 10 is secured to the bottom end of the bar and this extends through a slot 11 in the side wall of the oven. These bars, pins and slots are arranged at each side of the oven. The slot 11 is made up of a series of round openings 12 which are connected by slots 13. The walls of the round portion form shoulders which are adapted to engage a shoulder 14 on the pin 10, the shoulder being of a dimension to fit the round opening 12. The pin immediately outside of the shoulder has a smaller dimension which will pass through the slots 13 so that the pin may be moved from top to bottom of the slot. The bars 8 are sufficiently resilient to permit the pins to be pressed in and when the pins are pressed in the plate 6 may be moved up and down in the oven to the adjustment desired. A U-shaped bail 15 is secured to the upper plate 7 and has downwardly extending side bars 16 which extend into the guide channel 9. The bars 16 are provided with pins 17 and these pins are provided with a shoulder 18 operating in the slot 11 in the same manner as the pins 10. In this way, either the lower, or upper plate may be adjusted as circumstances may make desirable and this may be accomplished without opening the door and in response to any observed condition of the material being baked. All the plates are provided with an electric heating unit 19. These heating elements may be of any desired type, the elements in the plates 6 and 7, however, being exposed at the bottom so as to expose the material being baked on the plate below them to direct radiant heat. The heating elements are connected through wires 20 with a terminal plug 21, these wires being preferably long enough to permit of the removal of the heating plate from the oven for cleaning purposes. They are, however, preferably permanently attached.

What I claim as new is:—

1. In an electric oven, the combination of oven walls enclosing the oven; an electrically heated plate within the oven; and means operable from without the closed oven and with the plate within the oven for adjusting the level of the plate in the oven, said means comprising supporting bars at the sides of the plate and parts extending therefrom one through each side wall of the oven at each side of the oven permitting the adjustment of the plates by raising and lowering the projecting parts, said means also comprising guiding devices maintaining the plate in approximately a horizontal plane.

2. In an electric oven, the combination of oven walls enclosing the oven; an electrically heated plate within the oven; and means operable from without the closed oven and with the plate within the oven for adjusting the level of the plate in the oven, said means comprising shouldered slots in the oven wall at each side of the oven, supporting bars at the sides of the plate, and parts extending from the bars through the slots and adapted to engage the shoulders of the slots, the plate being adjustable by raising and lowering the parts projecting through the slots.

3. In an electric oven, the combination of oven walls enclosing the oven; an electrically heated plate within the oven; and means operable from without the closed oven and with the plate within the oven for adjusting the level of the plate in the oven, said means comprising shouldered slots in the oven wall at each side of the oven, pins extending through said shouldered slots having different cross dimensions, the pins in their larger dimension engaging the shoulders of the slots for locking the plate in adjusted position and the smaller dimension permitting the pins to move in the slots to adjust the plate, said pins forming a supporting means adjusting the plate through the raising and lowering of the projecting pins.

4. In an electric oven, the combination of oven walls enclosing the oven; an electrically heated plate within the oven; and means operable from without the closed oven and with the plate within the oven for adjusting the level of the plate in the oven, said means comprising shouldered slots in the sides of the oven, and bars secured to the sides of the plates, parts of the bars extending through the slots, said parts adjusting the plates as they are raised and lowered and said bars yieldably holding the parts in engagement with the shoulders but permitting the parts to be moved from the shoulders for adjustment in the slots.

5. In an electric oven, the combination of oven walls enclosing the oven; a plurality of electrically heated plates within the oven; and means operable from without the closed oven and with the plates within the oven for adjusting the level of the plates in the oven, said means comprising shouldered slots in the oven walls at each side of the oven, and two pairs of pins, one pair connected with each plate extending through the slots, said pins forming a means for actuating the plates to adjust them and for engaging the shoulders in the slots for locking the plates in adjustment.

6. In an electric oven, the combination of an oven wall, said oven wall having vertical slots; an electrically heated plate in the oven; a channel guide formed along the sides of the oven wall at each side of the oven; and bars extending from the electrically heated plate in the channels and through the slots and forming means for adjusting the plate, the channels forming guides for the bars.

CARL R. ANDERSON.